(12) United States Patent
Linderoth

(10) Patent No.: US 9,156,190 B2
(45) Date of Patent: Oct. 13, 2015

(54) METHOD FOR SINTERING

(75) Inventor: Søren Linderoth, Roskilde (DE)

(73) Assignee: Technical University of Denmark, Lyngby (DK)

( * ) Notice: Subject to any disclaimer, the term of this patent is extended or adjusted under 35 U.S.C. 154(b) by 230 days.

(21) Appl. No.: 13/808,547

(22) PCT Filed: Jun. 30, 2011

(86) PCT No.: PCT/EP2011/003230
§ 371 (c)(1),
(2), (4) Date: Jan. 4, 2013

(87) PCT Pub. No.: WO2012/003937
PCT Pub. Date: Jan. 12, 2012

(65) Prior Publication Data
US 2013/0106032 A1    May 2, 2013

(30) Foreign Application Priority Data
Jul. 7, 2010    (EP) .................................... 10007032

(51) Int. Cl.
*B29B 13/02*    (2006.01)
*H01M 4/86*    (2006.01)
*H01M 4/88*    (2006.01)
*H01M 8/12*    (2006.01)

(52) U.S. Cl.
CPC ........... *B29B 13/022* (2013.01); *H01M 4/8621* (2013.01); *H01M 4/8814* (2013.01); *H01M 4/8885* (2013.01); *H01M 4/8889* (2013.01); *H01M 8/1253* (2013.01); *Y02E 60/521* (2013.01); *Y02E 60/525* (2013.01)

(58) Field of Classification Search
CPC ...................................................... B29B 13/02
USPC .................. 264/605–609, 671, 672
See application file for complete search history.

(56) References Cited

U.S. PATENT DOCUMENTS

| | | | | |
|---|---|---|---|---|
| 4,340,436 | A | * | 7/1982 | Dubetsky et al. .......... 156/89.18 |
| 5,628,849 | A | * | 5/1997 | Fasano et al. ................. 264/614 |
| 5,753,162 | A | * | 5/1998 | Fasano et al. ................. 264/654 |
| 5,755,570 | A | * | 5/1998 | Shinde et al. ................. 432/253 |

FOREIGN PATENT DOCUMENTS

| | | |
|---|---|---|
| CN | 1128199 A | 8/1996 |
| CN | 1311513 A | 9/2001 |
| CN | 1463448 A | 12/2003 |

(Continued)

*Primary Examiner* — Joseph S Del Sole
*Assistant Examiner* — Russell Kemmerle, III
(74) *Attorney, Agent, or Firm* — Dickstein Shapiro LLP

(57) ABSTRACT

The present invention provides a method for sintering, comprising in the following order the steps of: providing a body in the green state or in the pre-sintered state on a support; providing a load on at least one spacer on the support such that the load is located above said body in the green state or in the pre-sintered state without contacting the body; heat treating the body in the green state or in the pre-sintered state at a temperature above the decomposition temperature of organic components contained in the green body and below the softening temperature or decomposition temperature of the spacer; heat treating the body in the green state or in the pre-sintered state at a temperature above the softening point or decomposition temperature of the spacer and below a sintering temperature such that the load contacts the body, and—sintering the body in the green state or pre-sintered state.

8 Claims, 1 Drawing Sheet

(56) References Cited

FOREIGN PATENT DOCUMENTS

| | | | |
|---|---|---|---|
| CN | 1679189 A | 10/2005 | |
| EP | 2 031 684 A2 | 3/2009 | |
| EP | 2 104 165 A1 | 9/2009 | |
| JP | S5832075 A | 2/1983 | |
| JP | S61205673 A | 9/1986 | |
| JP | H08325066 A | 12/1996 | |
| JP | 2005306672 A | 11/2005 | |
| JP | 2006327901 A | 12/2006 | |
| WO | WO 2005/027239 A2 | 3/2005 | |
| WO | WO 2010/030300 A1 | 3/2010 | |

* cited by examiner

METHOD FOR SINTERING

The present invention provides an improved method for sintering a body in the green or pre-sintered state.

BACKGROUND ART

Generally, solid oxide cells (SOCs) generally include cells designed for different applications, such as solid oxide fuel cells (SOFCs), solid oxide electrolysis cells (SOECs), or membranes. Due to their common basic structure, the same cell may, for example, be used in SOFC applications as well as in SOEC applications. Since in SOFCs fuel is fed into the cell and converted into power, while in SOECs power is applied to produce fuel, these cells are referred to as 'reversible' cells.

Solid oxide fuel cells (SOFCs) are well known in the art and come in various designs. Typical configurations include an electrolyte layer being sandwiched in between two electrodes. During operation, usually at temperatures of about 500° C. to about 1100° C., one electrode is in contact with oxygen or air, while the other electrode is in contact with a fuel gas.

The most common manufacture processes suggested in the prior art comprise the manufacture of single cells. Generally, a support is provided, on which an anode layer is formed in the green, i.e. unsintered state, followed by the application of an electrolyte layer and a second electrode layer in their green state. The so formed half cell is dried and afterwards sintered at temperatures of up to 1600° C., in some cases in a reducing atmosphere.

The sintering step of the green body however disadvantageously leads to several problems. Since the different layers have a different thermal expansion coefficient, the planar shape of the layers tends to bend during sintering, which causes contact problems if said cell is to be used in a cell stack. Cells being deformed cannot be used and are discarded, making mass production very cost and material extensive and so far unpractical for today's industrial requirements.

In EP-A-2104165 it has thus been suggested to use a symmetrical layer arrangement, wherein the two electrode layers sandwiching the electrolyte layer are formed from the same material. Due to said arrangement, thermal stress during sintering reduces the deformation of the body as the outer layers expand and contract at the same rate. However, this type of cell is very restricted to specific materials as the anode and cathode materials in their green state must have the same thermal expansion coefficient.

It has therefore been desired to improve the manufacturing process of solid oxide cells, to avoid material waste and to make the process more cost effective.

OBJECT OF THE INVENTION

The object underlying the invention has been to provide an improved process for the production of solid oxide cells, by which process solid oxide cells can be produced more efficiently, with less waste material and with fewer unusable cells due to defects caused during the production process.

BRIEF SUMMARY OF THE INVENTION

The present invention provides a method for sintering, said method comprising, in the following order, the steps of:
providing a body in the green state or in the pre-sintered state on a support;
providing a load on at least one spacer on the support such that the load is located above said body in the green state or in the pre-sintered state without contacting the body;
heat treating the body in the green state or in the pre-sintered state at a temperature above the decomposition temperature of organic components contained in the green body and below the softening temperature or decomposition temperature of the spacer;
heat treating the body in the green state or in the pre-sintered state at a temperature above the softening point or decomposition temperature of the spacer and below a sintering temperature such that the load contacts the body, and
sintering the body in the green state or pre-sintered state.

Preferred embodiments are set forth in the dependent claims and in the following detailed description of the invention.

DETAILED DESCRIPTION OF THE INVENTION

The present invention provides a method for sintering, said method comprising, in the following order, the steps of:
providing a body in the green state or in the pre-sintered state on a support;
providing a load on at least one spacer on the support such that the load is located above said body in the green state or in the pre-sintered state without contacting the body;
heat treating the body in the green state or in the pre-sintered state at a temperature above the decomposition temperature of organic components contained in the green body and below the softening temperature or decomposition temperature of the spacer;
heat treating the body in the green state or in the pre-sintered state at a temperature above the softening point or decomposition temperature of the spacer and below a sintering temperature such that the load contacts the body, and
sintering the body in the green state or pre-sintered state.

Advantageously, with the method of the present invention, the sintering of a green body is improved in a one-step procedure, i.e. by proceeding conventionally, and can thus be adopted without any additional method steps or additional preparations required for the green body in conventional processes.

Since the load is provided on at least one spacer on the support such that the load is located above said body in the green state or in the pre-sintered state without contacting the body, the green body does not stick to the load prior to sintering. If the load was brought directly in contact with the green body, parts of the green body might stick to the load, because the green body exhibits a slight tackiness, and after removal of the load after sintering, parts of the body tend to remain on the load. They are difficult to remove, and the body tends to break easily.

In a preferred embodiment, the load does not contact the green body at all. However, a small part of the green body may initially be in contact with the load, for example because the green body is not completely flat but comprises an elevation or ridge, or because the green body is slightly bent. This is not detrimental, as long as the contact surface is sufficiently small.

Furthermore, advantageously, since the load is not in contact with the green body initially, the body can move freely during the heat-up without disturbance of the load. Any movement of the green body due to organics and/or solvent being vaporized from the body is not affected and results in a very uniform sintered body. Moreover, any stress or strain from the load during heat-up is avoided, resulting in less formation of cracks in the obtained sintered body.

Figure 1:
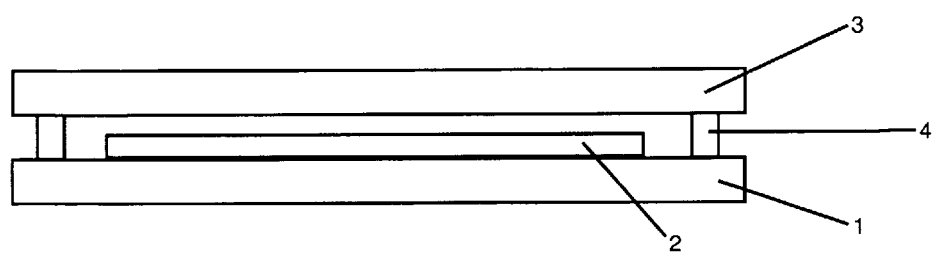
FIG. 1 illustrates the process of the present invention prior to the step of heat treating the body in the green state or in the pre-sintered state at a temperature above the decomposition temperature of organic components contained in the green body and below the softening temperature or decomposition temperature of the spacer. The green body 2 and spacers 4 are provided on a support 1, and a load 3 is placed on the spacers.

The initial setup is illustrated in FIG. 1. The green body 2 and at least one spacer 4 are provided on a support 1, and a load 3 is placed on the spacer. In FIG. 1, two spacers 4 are shown, but of course only one or more than two spacers can be used if desired. The load 3 is not in contact with the initial green body.

Preferably, the treatment of the body in the green state or pre-sintered state at a temperature above the decomposition temperature of organic components contained in the green body and below the decomposition temperature of the spacer is carried out at a temperature of from 200 to 600° C., more preferably of from 300 to 500° C., and even more preferably at a temperature of from 350 to 450° C.

It is further preferred that the treatment of the body in the green state or pre-sintered state at a temperature above the softening point or decomposition temperature of the spacer and below the sintering temperature is carried out at a temperature of from 400 to 900° C., more preferably from 450 to 850° C., and most preferably from 500 to 800° C.

The sintering is preferably carried out at a temperature above the softening point or decomposition temperature of the spacer. Once the spacer has softened or decomposed, the load substantially contacts the green body. More specifically, the load will be in contact over the whole area of the green body so as to ensure a very uniform sintered body.

The sintering temperature is high enough to ensure the sintering of the green body and depends on the materials employed. Preferably, the sintering temperature is from 950 to 1500° C., more preferably from 1000 to 1400° C., and even more preferably from 1100 to 1350° C.

Figure 2:
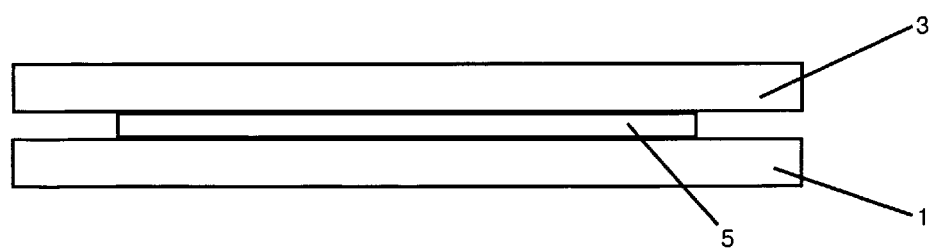
FIG. 2 illustrates the process of the present invention after sintering. The sintered body 5 is now sandwiched in between the support 1 and the load 3.

FIG. 2 illustrates the process of the present invention after sintering. The sintered body 5 is sandwiched in between the support 1 and the load 3. In this specific embodiment, spacer 4 has been decomposed. The load 3 contacts the sintered body over the whole area and ensures a very uniform sintered body. Advantageously, due to the method of the present invention, the load does not adhere to the sintered body and can thus be easily removed after cooling without causing cracks.

The at least one spacer is preferably selected from carbon materials, metals, metal alloys, metal composites, polymeric materials and mixtures thereof. Most preferred are carbon materials, such as graphite, and polymeric materials. The choice of materials depends on the atmospheric conditions during sintering, i.e. whether the sintering is carried out under reducing conditions or in an inert atmosphere, and can be appropriately chosen according to need.

Also preferred is the at least one spacer being provided in form of a rod, coil, brick or spring. Preferred for carbon materials are blocks, bricks or rods. Carbon rods or bricks burn during the heating and vaporize completely, allowing the load to get into contact during the heating. If metals or metal alloys are used, the spacer may also be used in form of a spring, which softens during heating and allows the load, due to its weight, to get into contact with the green body over the complete area.

The material for the support is generally not limited to specific materials. However, in view of the requirements to withstand elevated temperatures, weight and resistance to various sintering conditions, such as a reducing atmosphere, a ceramic support is preferred. More preferably, the ceramic support is selected from alumina, zirconia or zirconia coated alumina.

In the method of the present invention the load is preferably a flat plate. More preferably, the load is formed of a ceramic material. The load can be applied by placing the ceramic plate on top before applying the heat treatment. The form of a plate advantageously provides a uniform weight over the whole area and results in a flat and even sintered body.

Preferred materials for the load are selected from alumina, zirconia or zirconia coated alumina.

It is further preferred that the support and the load are formed from the same material. This ensures an identical thermal expansion coefficient and allows a very uniform expansion of the materials during the heating and cooling of the materials, thereby minimizing stress or strain from the support and load on the green or sintered body.

The heat treatment of the body in the green state or pre-sintered state at a temperature above the decomposition temperature of organic components contained in the green body and below the decomposition temperature of the spacer is preferably carried out for 0.5 to 5 hours, more preferably for 1 to 3 hours, and even more preferably for 1.5 to 2 hours. The actual time depends on the materials and amount of solvent used and can be fine tuned to match the requirements of the chosen materials.

In the method of the present invention, it is further preferred that the heat treatment of the body in the green state or pre-sintered state at a temperature above the decomposition temperature of the spacer and below the sintering temperature is carried out for 0.5 to 5 hours, more preferably for 1 to 3 hours, and even more preferably for 1.5 to 2 hours.

The sintering step is preferably carried out for 0.5 to 5 hours, more preferably for 1 to 3 hours, and even more preferably for 1.5 to 2 hours.

In another embodiment of the method of the present invention, the method comprises the provision of a body comprising at least two layers in the green state or pre-sintered state on a support. More preferably, the body comprises at least three layers. The layers forming a laminate can be applied on top of each other by, for example, lamination under pressure, spray painting, printing or tape casting.

The method can be applied wherever a sintering step of a green body is required. The method is most suited for the manufacture of solid oxide cells and membranes.

The method will now be illustrated by the following examples. The invention is however not limited to the specific embodiments of the examples.

EXAMPLES

Example 1

An unsintered, i.e. green, body consisting of zirconia-coated alumina was placed on top of a ceramic plate. The height of the body was 500 µm, and the body had a square shape of 24×24 cm².

Small graphite blocks with a thickness of 1 mm were placed on the support without contacting the green body. A second ceramic plate, being identical to the ceramic plate used as the support, was placed on top of the graphite blocks. The assembly was placed in a furnace and the temperature was raised to 500° C. with an increase of 100° C./h. Afterwards, the temperature was raised to 1300° C. by a rate of 150° C./h for about 2 hours before cooling down to room temperature at a rate of 200° C./h.

At a temperature of about 400° C., a shrinking of the green body was observed. At a temperature of about 600° C., the graphite blocks started to burn away, and the second ceramic plate came in contact with the green body, thereby covering the green body over the whole area.

The sintered body was completely flat and did not show any unevenness or variations in thickness.

Comparative Example 1

The same materials as employed in Example 1 were used, but the placement of the second plate on top of the graphite blocks was omitted.

The green body showed a shrinking behaviour at about 400° C. The final sintered body showed a shrinking in plane of about 15% and was bent at the edges, thus having an uneven thickness which was clearly visible by optical inspection.

Comparative Example 2

The same materials as employed in Example 1 were used, but the second plate was directly placed on top of the green body, without using graphite blocks to maintain the load above the green body.

The final sintered body showed an even thickness throughout the body, but a crack was formed across the body during removal of the load due to a part of the body sticking to the load.

Comparative Example 3

The same materials as employed in Example 1 were used, but the second plate was directly placed on top of the green body, without using graphite blocks to maintain the load above the green body.

The final sintered body showed an even thickness throughout the body, but a crack was formed across the body due to adhesion and limited freedom to move during the pre-sintering and sintering step.

The invention claims is:

1. A method for sintering, said method comprising, in the following order, the steps of:
    providing a body in the green state or in the pre-sintered state on a support;
    providing a load on at least one spacer on the support such that the load is located above said body in the green state or in the pre-sintered state without contacting the body, wherein the load and the support are formed from the same material;
    heat treating the body in the green state or in the pre-sintered state at a temperature above the decomposition temperature of organic components contained in the green body and below the softening temperature or decomposition temperature of the spacer, wherein the heat treatment is carried out at a temperature of from 350 to 450° C. for 0.5 to 5 hours;
    heat treating the body in the green state or in the pre-sintered state at a temperature above the softening point or decomposition temperature of the spacer and below a sintering temperature such that the load contacts the body, wherein the heat treatment is carried out at a temperature of from 500 to 800° C. for 0.5 to 5 hours; and
    sintering the body in the green state or pre-sintered state at a temperature of from 950° C. to 1500° C. for 0.5 to 5 hours,
    wherein the at least one spacer is selected from carbon materials, polymeric materials and mixtures thereof.

2. The method of claim 1, wherein the at least one spacer is provided in form of a rod, coil, brick or spring.

3. The method of claim 1, wherein the support is a ceramic support.

4. The method of claim 3, wherein the ceramic support is selected from alumina, zirconia or zirconia coated alumina.

5. The method of claim 1, wherein the load is a flat plate.

6. The method of claim 5, wherein the load is formed of a ceramic material.

7. The method of claim 6, wherein the load is selected from alumina, zirconia or zirconia coated alumina.

8. The method of claim 1, wherein the method comprises the provision of a body comprising at least two layers in the green state or pre-sintered state on a support.

* * * * *